United States Patent
Iwata et al.

(10) Patent No.: US 7,907,006 B2
(45) Date of Patent: Mar. 15, 2011

(54) DEMODULATOR

(75) Inventors: Shigeyasu Iwata, Hamura (JP);
Toshifumi Yamamoto, Sagamihara (JP);
Takashi Minemura, Ome (JP);
Toshiyuki Umeda, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 12/399,451

(22) Filed: Mar. 6, 2009

(65) Prior Publication Data
US 2009/0302935 A1    Dec. 10, 2009

(30) Foreign Application Priority Data
Jun. 10, 2008    (JP) .................. 2008-151830

(51) Int. Cl.
*H03D 1/06* (2006.01)
*H03D 1/08* (2006.01)

(52) U.S. Cl. .................. 329/353; 329/369; 375/320

(58) Field of Classification Search ............... 329/347, 329/349, 353, 369; 375/320
See application file for complete search history.

(56) References Cited

U.S. PATENT DOCUMENTS
6,597,238 B1    7/2003    Matsumoto et al.

FOREIGN PATENT DOCUMENTS

| JP | 62-91907 | 4/1987 |
|---|---|---|
| JP | 5-54311 | 3/1993 |
| JP | 8-125697 | 5/1996 |
| JP | 9-116576 | 5/1997 |
| JP | 2000-165214 | 6/2000 |
| JP | 2002-335296 | 11/2002 |
| JP | 2003-142991 | 5/2003 |
| JP | 2005-327104 | 11/2005 |
| JP | 2006-34085 | 2/2006 |
| JP | 2006-295319 | 10/2006 |
| JP | 2007-201793 | 8/2007 |

OTHER PUBLICATIONS

Notification of Reasons for Rejection mailed May 26, 2009, from the Japanese Patent Office for corresponding Japanese Patent Application No. 2008-151830.

*Primary Examiner* — Robert Pascal
*Assistant Examiner* — James E Goodley
(74) *Attorney, Agent, or Firm* — Finnegan, Henderson, Farabow, Garrett & Dunner, L.L.P.

(57) ABSTRACT

According to one embodiment, a threshold adjusting apparatus for a clocked comparator, the clocked comparator comparing an input signal with a threshold in accordance with a clock, the threshold adjusting apparatus comprises an output detection module configured to detect an output from the clocked comparator with the threshold while changing the threshold and a setting module configured to set the threshold when the output detection module detects a change in the output from the clocked comparator as an adjusted threshold.

8 Claims, 8 Drawing Sheets

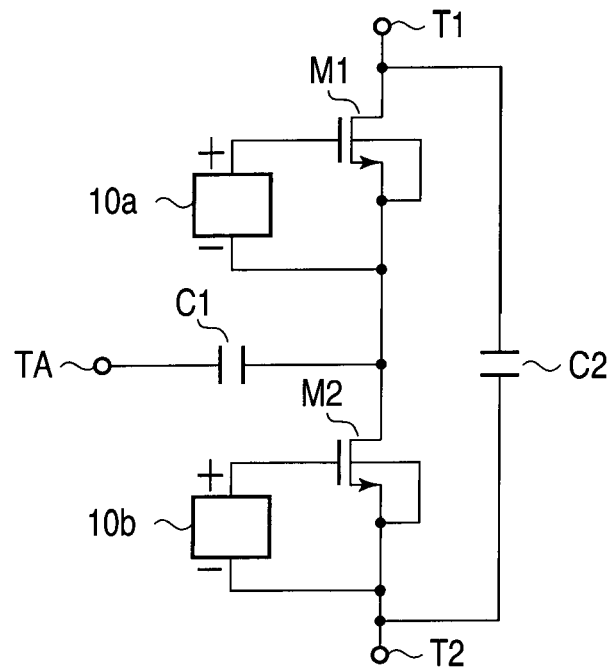
F I G. 2
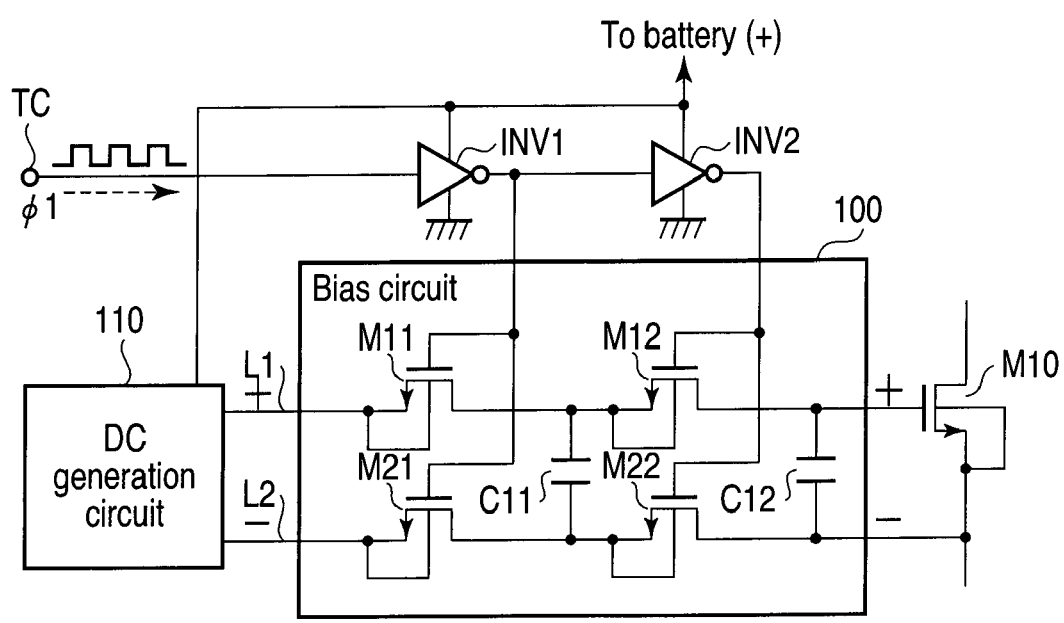
F I G. 3

| S | R | Vout |
|---|---|------|
| 0 | 0 | Hold |
| 0 | 1 | 0 |
| 1 | 0 | 1 |
| 1 | 1 | Inhibit input |

DEMODULATOR

CROSS-REFERENCE TO RELATED APPLICATIONS

This application is based upon and claims the benefit of priority from Japanese Patent Application No. 2008-151830, filed Jun. 10, 2008, the entire contents of which are incorporated herein by reference.

BACKGROUND

1. Field

One embodiment of the invention relates to an amplitude shift keying (ASK) demodulator.

2. Description of the Related Art

An ASK demodulator circuit for demodulating an ASK-modulated input signal generally comprises a rectifier circuit and a comparator. The rectifier circuit rectifies and detects a signal received with an antenna, and produces a demodulated signal. This demodulated signal is compared with a threshold by a comparator, amplified to a logical level and thereby converted to a binary signal. The comparator is often provided with a hysteresis function to suppress an error resulting from noise. With the hysteresis function, the comparator becomes resistant to the noise; however, it is difficult to improve receiver sensitivity of the comparator.

In general, receiver sensitivity of a rectifier circuit is low since the rectifier circuit can not rectify input signal power smaller than a threshold of a diode (about 0.7V). A high-gain rectifier circuit disclosed in Jpn. Pat. Appln. KOKAI Publication No. 2006-34085 comprises an NMOS transistor, and the threshold voltage is caused to substantially be 0V by applying a voltage corresponding to a threshold voltage of the NMOS transistor between a gate and a source. This configuration of the high-gain rectifier circuit enables to rectify even a minute AC signal having an effective value equal to or less than the threshold. That is, according to the high-gain rectifier circuit, receiver sensitivity can be improved.

In order to improve receiver sensitivity of a comparator, it is necessary to set a threshold low while eliminating hysteresis. In such a case, a DC offset voltage due to variations in an element contained in the comparator needs to be taken into consideration. When the DC offset voltage largely varies in the positive-value side, the receiver sensitivity may decrease. When the DC offset voltage largely varies in the negative-value side, a logical level of an output may be "1" even if an input voltage is 0V (erroneous operation). To prevent the error, the threshold of the comparator should be set high in consideration of the variation in the DC offset voltage. Therefore, it is difficult to improve receiver sensitivity of the comparator. Furthermore, a size of an element needs to be larger to reduce the DC offset voltage due to variation in the element; thus, the cost will be increased.

According to the high-gain rectifier circuit disclosed in Jpn. Pat. Appln. KOKAI Publication No. 2006-34085, bias voltage is supplied to the rectifier circuit using a clock signal. Therefore, a noise appears in an output of the rectifier circuit in synchronization with the clock signal. To suppress the noise that is synchronized with the clock signal, a time constant of the rectifier circuit output needs to be larger, and it becomes therefore difficult to improve a data rate.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary diagram showing an example of a configuration of a rectifier circuit used in the ASK demodulator circuit of FIG. 1;

FIG. 3 is an exemplary circuit diagram showing a configuration of a bias circuit used in the rectifier circuit of FIG. 2;

DETAILED DESCRIPTION

Various embodiments according to the invention will be described hereinafter with reference to the accompanying drawings. In general, according to one embodiment of the invention, a threshold adjusting apparatus for a clocked comparator, the clocked comparator comparing an input signal with a threshold in accordance with a clock, the threshold adjusting apparatus comprises an output detection module configured to detect an output from the clocked comparator with the threshold while changing the threshold and a setting module configured to set the threshold when the output detection module detects a change in the output from the clocked comparator as an adjusted threshold.

Hereinafter, embodiments of an amplitude shift keying (ASK) demodulator according to the present invention will be explained with reference to the accompanying drawings.

First Embodiment

Figure 1:
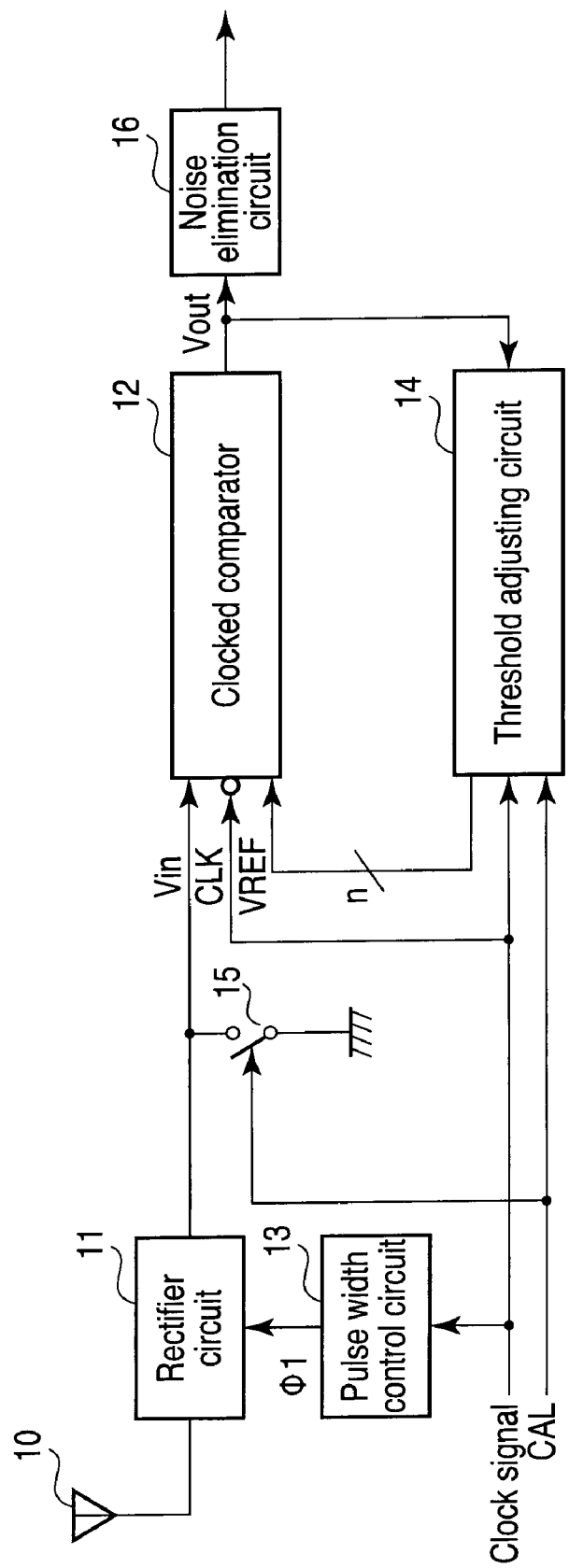
FIG. 1 is an exemplary block diagram showing an example of a configuration of an ASK demodulator circuit according to a first embodiment of the present invention.

FIG. 1 is an exemplary view showing an example of a configuration of an amplitude shift keying (ASK) demodulator circuit according to the first embodiment of the present invention.

A signal from an antenna 10 is supplied to a clocked comparator 12 via a rectifier circuit 11. An output from the clocked comparator 12 is output via a noise elimination circuit 16. A predetermined bias voltage which is set for the rectifier circuit 11 is supplied in synchronization with a clock pulse φ1. The clock pulse φ1 is output from a pulse width control circuit 13 to which a clock signal CLK is supplied. The clock signal CLK is also supplied to the clocked comparator 12 and a threshold adjusting circuit 14. An output Vout from the clocked comparator 12 is input to the threshold adjusting circuit 14. The threshold adjusting circuit 14 supplies a threshold adjusting signal VREF, which is an n-bit digital signal, to the clocked comparator 12. An input terminal of the clocked comparator 12 is connected to ground (or reference voltage) via a switch 15. A correction signal CAL includes a control signal for the switch 15. The correction signal CAL is also supplied to the threshold adjusting circuit 14 and operation (state transition) of the threshold adjusting circuit 14 is thereby controlled.

The antenna 10 receives a radio signal transmitted from outside. The antenna 10 is used, for example, for wireless communication with a non-contact type wireless device, or for receiving a control signal or the like from a remote controller.

The rectifier circuit 11 converts a radio frequency into a direct current. The rectifier circuit 11 rectifies and detects an input signal received with the antenna 10 and produces a demodulated signal. Predetermined threshold voltage V1 (about 0.7V) is set for the rectifier circuit 11, and whether a signal having intensity equal to or greater than the threshold voltage V1 is received or not is detected. For improving sensitivity, the rectifier circuit 11 according to the present embodiment comprises a high-gain rectifier circuit in which a bias voltage V2 is preliminarily applied to a diode contained in the rectifier circuit 11. With this bias voltage V2, even when intensity D of a signal received with the antenna 10 is weak, the received signal can be detected as long as a sum of the signal intensity D and the bias voltage V2 substantially reaches the threshold voltage V1 of a transistor. Improvement in sensitivity can be therefore realized. For instance, in the case where V1=0.7V and V2=0.6V, a signal equal to or greater than 0.1V can be detected. Accordingly, even a weak input signal received with the antenna 10 can be detected.

An exemplary circuit diagram of the rectifier circuit 11 is shown in FIG. 2. The rectifier circuit 11 can rectify even a small alternate-current (AC) signal having an effective value equal to or less than the threshold voltage V1. To rectify the small signal with the rectifier circuit 11, a constant voltage is applied between a source and a gate of a diode-connected MOS transistor. The constant voltage may be less than the threshold voltage (e.g., 0.7V), which is required for the MOS transistor to exhibit rectifying property, and preferably in the vicinity of the threshold voltage.

In regard to an NMOS transistor M1 shown in FIG. 2, a back gate terminal is connected to a source terminal and a drain terminal is connected to a plus terminal T1. In addition, a bias circuit 10a capable of generating a predetermined voltage is connected between a gate terminal and the source terminal. With the above connection, the NMOS transistor M1 functions as a diode element utilizing a p-n junction on the drain side. The bias circuit 10a applies the above predetermined voltage between the gate terminal and the source terminal of the NMOS transistor M1. The bias circuit 10a can generate a voltage smaller than the threshold which is required for the NMOS transistor M1 to exhibit the rectifying property, as the predetermined voltage (hereinafter referred to as diode bias voltage). The diode bias voltage ranges, for example, from 0V to 1.0V, and a value in the vicinity of the threshold voltage (e.g., 0.6V) is preferable. In other words, the NMOS transistor M1 is biased with the diode bias voltage between the gate terminal and the source terminal, allowing rectification of an AC signal having an effective value less than the threshold voltage.

The above diode circuit can rectify an AC signal having an effective value approximately 100 mV, in the case where the diode bias voltage is, for example, 0.6V.

Similarly, in an NMOS transistor M2, a back gate terminal is connected to a source terminal, and the source terminal is connected to a minus terminal T2. In addition, a bias circuit 10b is connected between a gate terminal and the source terminal. The NMOS transistor M2 functions similarly to the NMOS transistor M1. The bias circuit 10b biases the NMOS transistor M2 between the gate terminal and the source terminal, with the diode bias voltage.

The source terminal of the NMOS transistor M1 and a drain terminal of the NMOS transistor M2 are connected with each other, and to the connection line thereof, one end of a capacitor C1 is connected. The other end of the capacitor C1 is connected to a signal input terminal TA. This capacitor C1 functions as a coupling capacitance.

A capacitor C2 is connected between the drain terminal of the NMOS transistor M1 and the source terminal of the NMOS transistor M2. Signals half-wave rectified by the NMOS transistors M1 and M2 is smoothed by a capacitor C2. Smoothing the signal allows providing a direct current (DC) voltage from between both ends of the capacitor C2, namely, between the plus terminal T1 and the minus terminal T2.

Furthermore, the NMOS transistors M1 and M2 are formed in a triple well structure, and isolated from a substrate. Thus, each source terminal is connected to P-well at the bottom of an NMOS transistor, and each drain terminal is connected to N-well. In addition, a diode element is formed inside the MOS transistor by p-n junction.

FIG. 3 is an exemplary circuit diagram showing an example configuration of the bias circuits 10a and 10b shown in FIG. 2. A bias circuit 100 shown in FIG. 3 corresponds to bias circuit 10a or 10b. An NMOS transistor M10 corresponds to the NMOS transistor M1 or M2. The bias circuit 100 comprises two NMOS transistors M11 and M12 which are connected in series. Each of the NMOS transistors M11 and M12 functions as a transfer gate and is arranged on a plus line L1. Similarly, the bias circuit 100 comprises two NMOS transistor M21 and M22 which are connected in series. Each of the NMOS transistors M21 and M22 functions as a transfer gate and is arranged on a minus line L2. A gate terminal of the NMOS transistor M11 and a gate terminal of the NMOS transistor M21 are connected to each other, and a gate terminal of the NMOS transistor M12 and a gate terminal of the NMOS transistor M22 are also connected to each other. A capacitor C11 is connected between two lines, that is, a line connecting a drain terminal of the NMOS transistor M11 and a source terminal of the NMOS transistor M12 and a line connecting a drain terminal of the NMOS transistor M21 and a source terminal of the NMOS transistor M22. Furthermore, a capacitor C12 is connected between a drain terminal of the NMOS transistor M12 and a drain terminal of the NMOS transistor M22.

Peripheral circuits such as a DC generation circuit 110 and inverters INV1 and INV 2 are connected to the bias circuit 100. The DC generation circuit 110 generates a DC voltage, which corresponds to the above-descried diode bias voltage, from a main power supply of an apparatus with which the rectifier circuit according to the present embodiment is mounted. The DC voltage generated by the DC generation circuit 110 is applied between the plus line L1 and the minus line L2 of the bias circuit 100. The NMOS transistor M10 represents the NMOS transistors M1 and M2 shown in FIG. 2. This NMOS transistor M10 operates with high frequency expressed by GHz. Therefore, a parasitic capacitance of the NMOS transistor M10 needs to be reduced as possible. The DC generation circuit 110 has a large capacitance for stably generating the DC voltage. For this reason, instead of directly applying the diode bias voltage provided from the DC generation circuit 110 between the gate and the source of the NMOS transistor M10, the bias circuit 100 shown in FIG. 3 is provided.

An input terminal of the inverter INV1 is connected to a clock input terminal TC, and a clock pulse (φ1) of a certain frequency is input thereto. This clock pulse is generated by, for example, a pulse width control circuit 13, which will be described later. An output terminal of the inverter INV1 is connected to the gates of the NMOS transistors M11 and M21, and also connected to an input terminal of the inverter INV2. An output terminal of the inverter INV2 is connected to the gates of the NMOS transistors M12 and M22.

When a logic level of the clock pulse input from the clock input terminal TC is "0", an output from the inverter INV1 has a logic level "1" and an output from the inverter INV2 has a logic level "0". Therefore, the NMOS transistors M11 and M21 are turned on, and the capacitor C11 is charged with the DC voltage supplied from the DC generation circuit 110. The NMOS transistors M12 and M22 are turned off and no DC voltage is applied to the capacitor C12.

On the other hand, when a logic level of the clock pulse input from the clock input terminal TC is "1", an output from the inverter INV1 has a logic level "0" and an output from the inverter INV2 has a logic level "1". Accordingly, the NMOS transistors M11 and M21 are turned off and the NMOS transistors M12 and M22 are turned on. Therefore, electric charges accumulated in the capacitor C11 are supplied to the capacitor C12. Both ends of the capacitor C12 are connected to an output terminal of the bias circuit 100. Thus, the voltage between the both terminals of the capacitor C12 is applied between the gate terminal and the source terminal of the diode-connected NMOS transistor M10, as the diode bias voltage.

It is only required that the voltage between the both terminals of the capacitor C12 eventually becomes the diode bias voltage of the NMOS transistor M10, and the DC voltage supplied from the DC generation circuit 110 need not necessarily be equal to the diode bias voltage. For instance, by switching the NMOS transistors M11, M12, M21, and M22 with pulse width modulation (PWM) control, a voltage of the capacitor C12 can be fixed at an arbitrary value. In this case, the DC generation circuit 110 may be eliminated, and the main power supply may be connected between the plus line L1 and minus line L2.

The rectifier circuit 11 outputs the detected demodulated signal to the clocked comparator 12. Predetermined threshold voltage which is different from the threshold voltage for the rectifier circuit 11 is set for the clocked comparator 12. The clocked comparator 12 converts the received demodulated signal Vin into a binary signal having a level of "1" or "0" in accordance with the clock pulse φ1. When intensity of the demodulated signal Vin output from the rectifier circuit 11 is equal to or larger than the threshold voltage, the clocked comparator 12 outputs "1", and when the demodulated signal Vin is smaller than the threshold voltage, the clocked comparator 12 outputs "0". The threshold adjusting circuit 14 adjusts the threshold voltage of the clocked comparator 12. Consequently, the clocked comparator 12 compares the demodulated signal output from the rectifier circuit 11 with threshold voltage depending on a threshold adjusting signal VREF that is an n-bit digital output adjusted by the threshold adjusting circuit 14.

Figure 4:
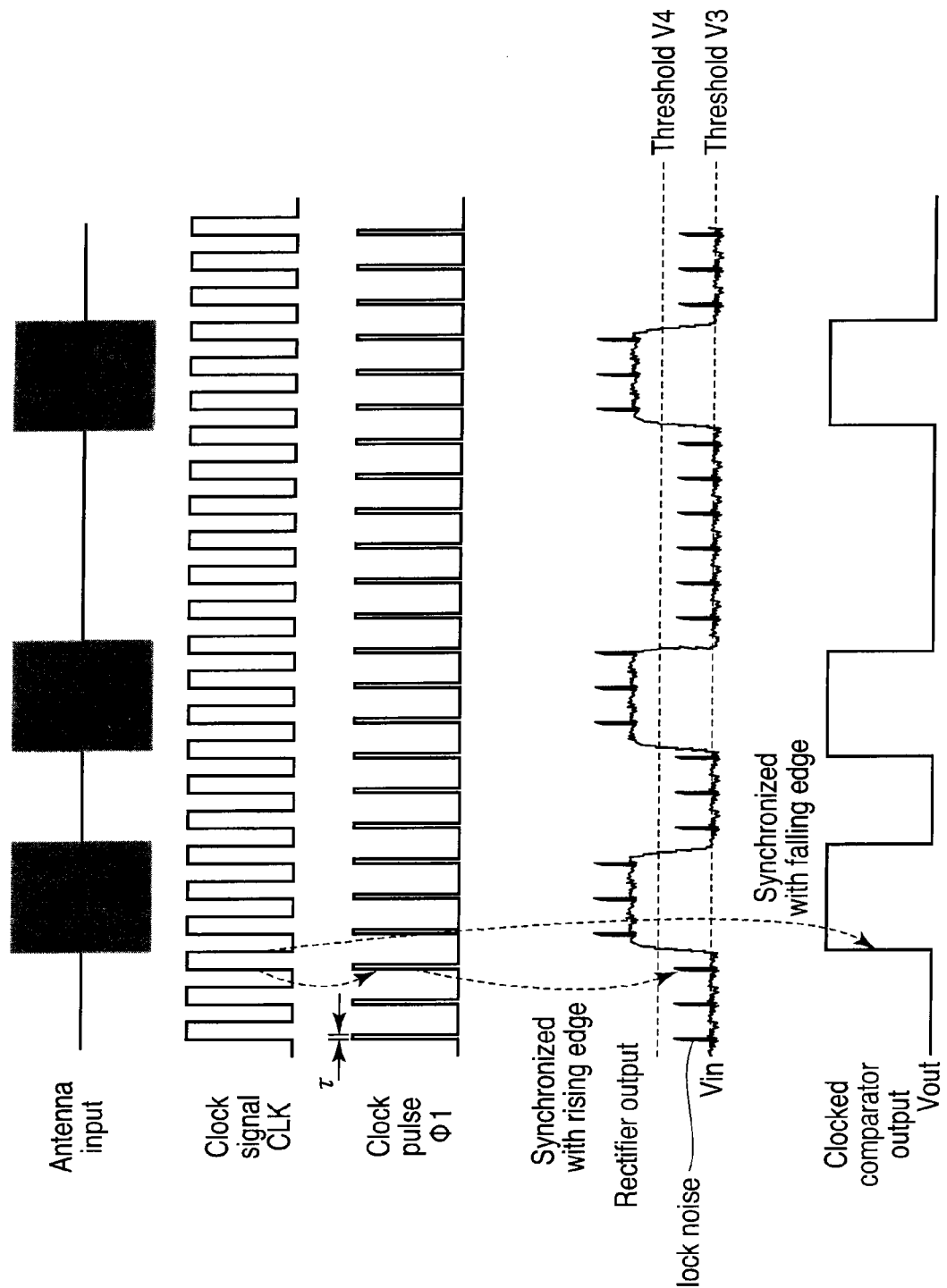
FIG. 4 is an exemplary view showing an example of a timing chart of the ASK demodulator circuit.

According to the rectifier circuit 11, a clock pulse (φ1) supplied to the clock input terminal TC is used for applying the bias voltage. The pulse width control circuit 13 outputs the clock pulse φ1 produced by adjusting a pulse width of the clock signal CLK to become τ. Rising edges of the clock signal CLK and the clock pulse φ1 are synchronized. Therefore, as shown in FIG. 4, a noise synchronized with the clock pulse φ1 is generated in the output from the rectifier circuit 11 (clock noise). Increasing a time constant of the output from the rectifier circuit 11 suppresses the clock noise synchronized with the clock pulse φ1. However, in such a case, it becomes difficult to improve a data rate.

Furthermore, in the case where the output from the rectifier circuit 11 contains the clock noise, when a threshold voltage V3 smaller than the clock noise and approximately equal to a random noise is set as the threshold voltage of the clocked comparator 12, the clocked comparator 12 may erroneously output "1" in response to the clock noise even though the input signal is 0V. Therefore, in order to correctly convert the output from the rectifier circuit 11, it is conceivable to set threshold voltage V4 which is greater than the clock noise. However, if the threshold voltage is set higher, the receiver sensitivity will decrease.

To prevent such decrease in the receiver sensitivity, the clocked comparator 12 of the present embodiment operates in synchronization with a falling edge of the clock pulse CLK, as indicated in FIG. 4. Thus, an operational phase of the clocked comparator 12 can be shifted from an operational phase of the clock noise generated in the output from the rectifier circuit 11 in synchronization with the clock pulse φ1. Therefore, it becomes unnecessary to make the threshold voltage higher than the clock noise, and the receiver sensitivity can be improved without lowering a data rate.

The receiver sensitivity of the clocked comparator 12 decreases depending on a DC offset voltage resulting from variation in an element of the clocked comparator 12. In the case where the DC offset voltage largely varies in a negative-value side, even when a signal of 0V is input, "1" may be output (error). Thus, it may also necessary that the threshold voltage is set high in consideration of the variation in the DC offset voltage. However, increasing the threshold voltage causes decrease in the receiver sensitivity. Furthermore, to decrease the DC offset voltage derived from the variation in the element, a size of the element needs to be enlarged; however, cost for enlarging the element will be increased.

The threshold adjusting circuit 14 is a digital circuit for adjusting decrease in the receiver sensitivity and an error caused by the DC offset voltage of the clocked comparator 12 and a frequency of errors due to the noise by controlling the threshold voltage of the clocked comparator 12.

Figure 5:
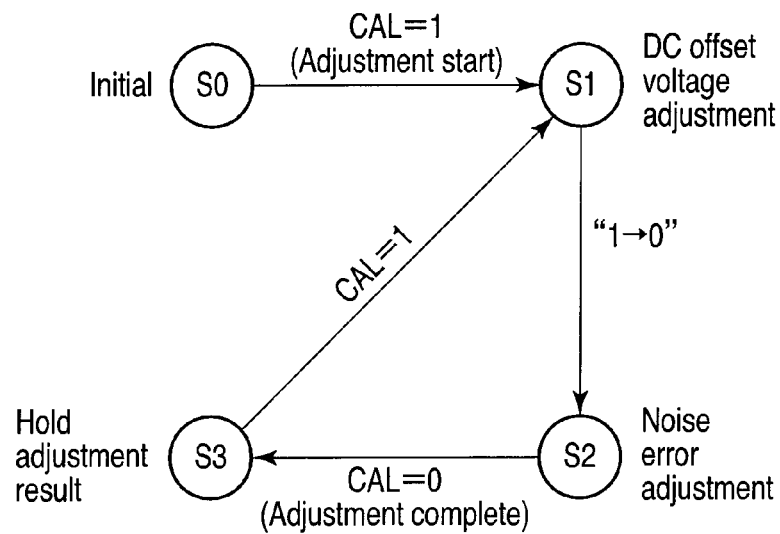
FIG. 5 is an exemplary view schematically showing operation state transition of a threshold adjusting circuit.

FIG. 5 is an exemplary view schematically showing operation state transition of the threshold adjusting circuit 14. At the time of performing adjustment of the threshold voltage, a switch 15 is turned on to connect an input voltage Vin of the clocked comparator 12 to ground (GND).

When a correction signal CAL=1 is input in the initial state (S0), the operation state of the threshold adjusting circuit 14 changes to a DC offset voltage adjusting state (S1).

In state S1, DC offset voltage of the clocked comparator 12 is detected. Since the input voltage Vin is connected to ground, expectation of output from the clocked comparator 12 is "0". However, the DC offset voltage may be normally-distributed; and accordingly, there may be a case in which not "0" but "1" is output. Therefore, in state S1, the threshold adjusting signal VREF for setting the threshold voltage higher than the DC offset voltage is provided to the clocked comparator 12.

The DC offset voltage of the clocked comparator 12 is detected with, for example, linear search as follows. While "1" is being output from the clocked comparator 12, the threshold adjusting signal VREF output from the threshold adjusting circuit 14 (and to be provided to the clocked comparator 12 as threshold voltage) is increased. The output VREF at the point when the output from the clocked comparator 12 is changed from "1" to "0" is determined as an adjusted threshold signal. On the other hand, when the expectation of the output from the clocked comparator 12 is "1" (in a case where the input voltage Vin is not connected to ground), while "0" is being output from the clocked comparator 12, the output VREF from the threshold adjusting circuit 14 is decreased. At the point when the output from the clocked comparator 12 is changed from "0" to "1", it is determined that the output VREF has fallen below the threshold voltage. The value of VREF output immediately before the change is determined as the adjusted threshold voltage. However, the adjusted threshold voltage may be set by searching the DC offset voltage with another search algorithm.

When the threshold voltage of the clocked comparator 12 is adjusted to be slightly higher than the DC offset voltage to improve the sensitivity in state S1, the noise may cause the clocked comparator 12 to operate erroneously. Therefore, the operation state of the threshold adjusting circuit 14 is changed to a noise error adjusting state (S2) and the adjusted threshold voltage VREF is set so that the occurrence frequency of errors (such a case in which the clocked comparator 12 erroneously outputs "1") due to the noise is suppressed to a given frequency R or lower. Tolerance to the occurrence frequency of errors may previously be defined arbitrarily.

In state S2, the output from the clocked comparator 12 is integrated over, for example, N samples. In the case where an expectation of the output from the clocked comparator 12 is "0", when an error occurs, the clocked comparator 12 outputs "1". Thus, an integral of the outputs from the clocked comparator 12 indicates the number M of occurred errors. Therefore, occurrence frequency R1 of errors in the output from the clocked comparator 12 is expressed as R1=M/N. When the occurrence frequency R1 of errors is greater than a predetermined occurrence frequency R, the threshold adjusting signal VREF output from the threshold adjusting circuit 14 is increased so as to supply a larger threshold voltage to the clocked comparator 12. On the other hand, when the occurrence frequency R1 is equal to or less than the predetermined occurrence frequency R, the signal VREF output from the threshold adjusting circuit 14 is maintained. That is, the output signal VREF is kept increased until the occurrence frequency R1 (=M/N) of errors becomes equal to or lower than the set occurrence frequency R, and greater threshold voltage is supplied to the clocked comparator 12.

After the DC offset voltage adjustment (state S1) and the noise error adjustment (state S2) are completed, the correction signal CAL becomes "0", and the operation state of the threshold adjusting circuit 14 is changed to a result holding state (S3). In the result holding state (S3), the threshold adjusting signal VREF is fixed, and the threshold voltage appropriately adjusted by the threshold adjusting circuit 14 for the clocked comparator 12 is maintained. The clocked comparator 12 compares the output from the rectifier circuit 11 and the adjusted threshold voltage being maintained.

Although the adjusted threshold voltage is held while the threshold adjusting circuit 14 is in the result holding state (S3), the threshold voltage and the DC offset voltage may vary depending on power supply voltage, the temperature and so on. Therefore, it may be required to adjust the threshold voltage again in accordance with changes in ambient environment. That is, the correction signal CAL=1 is input in response to the change in the ambient environment, and the operation state of the threshold adjusting circuit 14 is changed from the result holding state (S3) to the DC offset voltage adjusting state (S1). Then proper threshold voltage adjustment is newly performed in the DC offset voltage adjusting state (S1).

In FIG. 1, the switch 15 is connected to the output of the rectifier circuit 11. However, when the adjustment is performed under a condition that the output from the rectifier circuit 11 includes the noise, the switch 15 may be connected to the input of the rectifier circuit 11. Furthermore, the switch 15 may be turned off when the adjustment is performed under a condition that the output includes a noise from the antenna 10 and the rectifier circuit 11.

As described above, the threshold adjusting circuit 14 can adjust the DC offset voltage of the clocked comparator 12. Therefore, the threshold voltage can be lowered to a level (threshold voltage V3 shown in FIG. 4) below the clock noise and close to a random noise, and a stable ASK demodulator circuit with high sensitivity can be realized.

Figure 6:
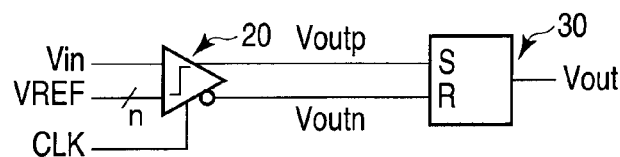
FIG. 6 is an exemplary view showing an example of a circuit configuration of a clocked comparator.

FIG. 6 is an exemplary view showing an example of a circuit configuration of the clocked comparator 12. The clocked comparator 12 comprises a dynamic latch 20 and a set-reset latch 30 (hereinafter referred to as "SR latch"). The dynamic latch 20 consumes a current only when a clock is operating. Thus, power consumption during standby for a wireless signal can be suppressed.

Figure 7:
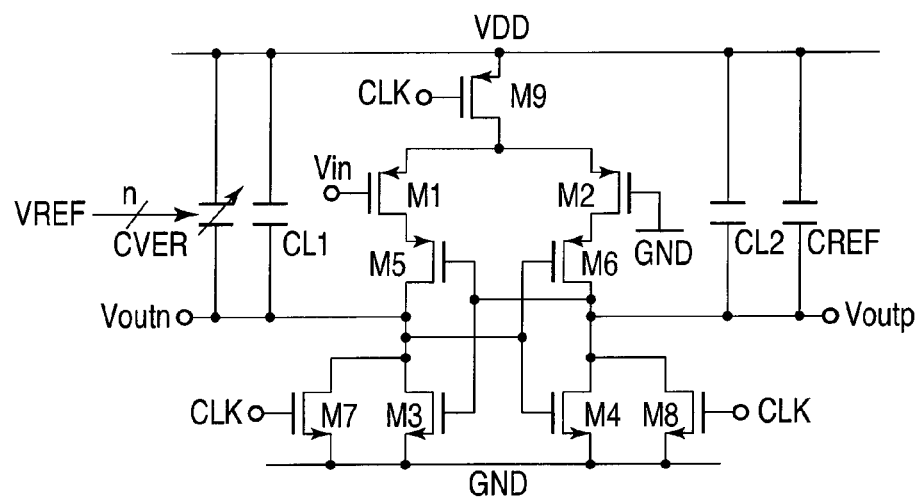
FIG. 7 is an exemplary view showing an example of a circuit configuration of a dynamic latch according to the first embodiment.

FIG. 7 is an exemplary view showing an example of a circuit configuration of the dynamic latch 20 according to the present embodiment. In FIG. 7, an output from the rectifier circuit 11 is connected to Vin.

The dynamic latch 20 can operate even with an input voltage of a ground level. The dynamic lath 20 reduces power consumption by pre-charging outputs Voutp and Voutn to ground (GND) while the clock signal CLK is "1".

The dynamic latch 20 comprises a differential pair comprising MOS transistors M1 and M2, a latch circuit comprising MOS transistors M3 to M6, and MOS switches M7 to M9. When a value of the clock signal CLK is "1", the MOS switches M7 and M8 are turned on and the MOS switch M9 is turned off. Therefore, no current flows, and outputs Voutp and Voutn are pre-charged to ground.

When the value of the clock signal CLK becomes "0", MOS switches M7 and M8 are turned off and outputs Voutp and Voutn are separated from the ground. In addition, MOS switch M9 is turned on and the current starts flowing.

When input voltage Vin is larger than ground voltage, current flowing through the left side path which contains MOS transistor M1, M3, and M5 becomes larger than current flowing through the right side path which contains MOS transistors M2, M4, and M6. Thus, a potential difference is generated between the Voutp and the Voutn. A positive feedback amplifier circuit comprising MOS transistors M3 to M6 amplifies thus generated output potential difference and sets output Voutp as VDD (power supply voltage) and output Voutn as ground voltage. This state is called a latch mode.

Figures 8, 9:
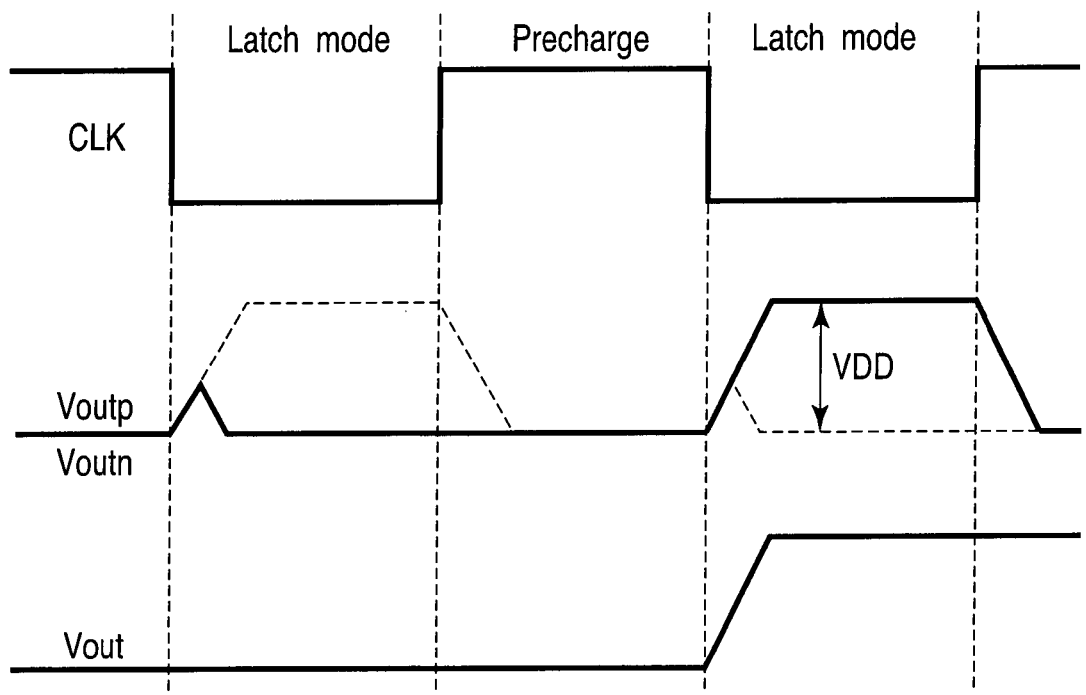
FIG. 8 is an exemplary view showing an example of operation of a clocked comparator.
FIG. 9 is an exemplary view showing a truth table for an SR latch.

The dynamic latch 20 performs comparison operation in half cycle while switching the pre-charge and the latch mode, as shown in FIG. 8. The SR latch 30 can be realized with a NAND type SR latch, and operates as shown in the truth table of FIG. 9. That is, "0" is output in the case where S (=Voutp)=0 and R (=Voutn)=1, and "1" is output in the case where S (=Voutp)=1 and R (=Voutn)=0.

The DC offset voltage of the dynamic latch 20 arises from mismatches in load capacitances CL1 and C12 of the outputs Voutp and Voutn and MOS transistors M1 and M2, MOS transistors M3 and M4, MOS transistors M5 and M6 and MOS transistors M7 and M8 contained in respective differential pairs. As shown in FIG. 7, by making a value of load capacitance CVER variable in accordance with the n-bit threshold adjusting signal VREF, the DC offset voltage can be controlled and the threshold voltage can be set arbitrarily. In FIG. 7, when the variable capacitance CVER is made larger than load capacitance CREF, the threshold voltage becomes larger, and when the variable capacitance CVER is made smaller than the load capacitance CREF, the threshold voltage becomes smaller.

To improve the receiver sensitivity without transmitting the error due to noise to the subsequent stage, the noise elimination circuit 16 provided subsequent to the comparator 12 eliminates the noise. The noise elimination circuit 16 determines a case in which "0" is consecutively input for N bits as "0" reception status, and determines a case where "1" is consecutively input for N bits as "1" reception status. Furthermore, the noise elimination circuit 16 determines a signal having pulse width equal to or less than N−1 bits as noise, and does not transmit the signal to the subsequent stage. A value of N can be arbitrarily set.

Figure 10:
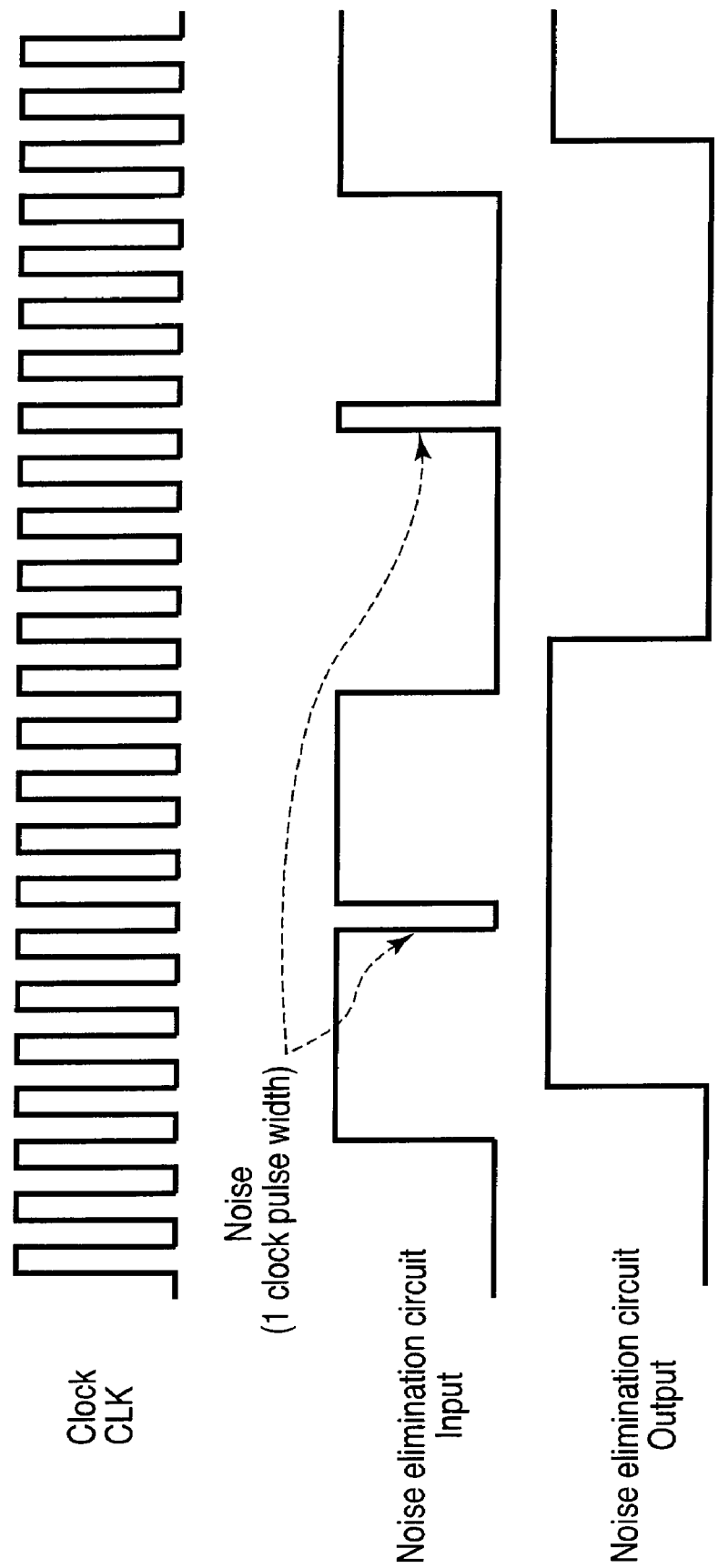
FIG. 10 is an exemplary view showing an example of operation of a noise elimination circuit.

FIG. 10 is an exemplary view showing an example of operation of the noise elimination circuit 16 in the case where N=2. As shown in FIG. 10, a pulse of which pulse width is 1 (=N−1) bit is regarded as noise, and the pulse is not output and transmitted to the subsequent stage. Therefore, even when "0" having 1-bit pulse width is input, the signal is determined as noise, and "1" is transmitted to the subsequent stage. Conversely, when "1" having 1-bit pulse width is input, the signal is regarded as noise, and "0" is transmitted to the subsequent stage. An output signal having pulse width equal to or more than 2 bits is directly transmitted to the subsequent stage.

As described above, according to the present embodiment, the clocked comparator 12 operates in synchronization with a falling edge of the clock signal CLK. Therefore, an operation phase of the clocked comparator 12 can differ from a phase of clock noise that is generated by the rectifier circuit 11 in synchronization with a rising edge of the clock signal CLK. Thus, influence of the clock noise can be eliminated.

According to the present embodiment, the threshold voltage of the clocked comparator 12 is adjusted by the threshold adjusting circuit 14. The adjustment of the threshold voltage enables elimination of influence exerted by the DC offset of the clocked comparator 12. Acceptable occurrence frequency of errors can be preliminarily set, and the threshold voltage of the clocked comparator 12 can be adjusted so that the frequency of error occurrence becomes equal to or lower than the set acceptable frequency.

Furthermore, according to the present embodiment, the noise elimination circuit 16, which is provided subsequent to the clocked comparator 12, determines a signal having pulse width narrower than a predetermined pulse width as noise. The signal determined as the noise is not sent to the subsequent stage. Thus, the noise can be eliminated further accurately.

It is expected that overhead of a digital circuit will be smaller as miniaturization of semiconductors advances. Therefore, as indicated in the present embodiment, digital adjustment of the threshold voltage is advantageous.

Other embodiments of the ASK demodulator according to the present invention will be described. The same portions as those of the first embodiment will be indicated in the same reference numerals and their detailed description will be omitted.

Second Embodiment

A second embodiment of the ASK demodulator circuit according to the present invention will be explained.

Figure 11:
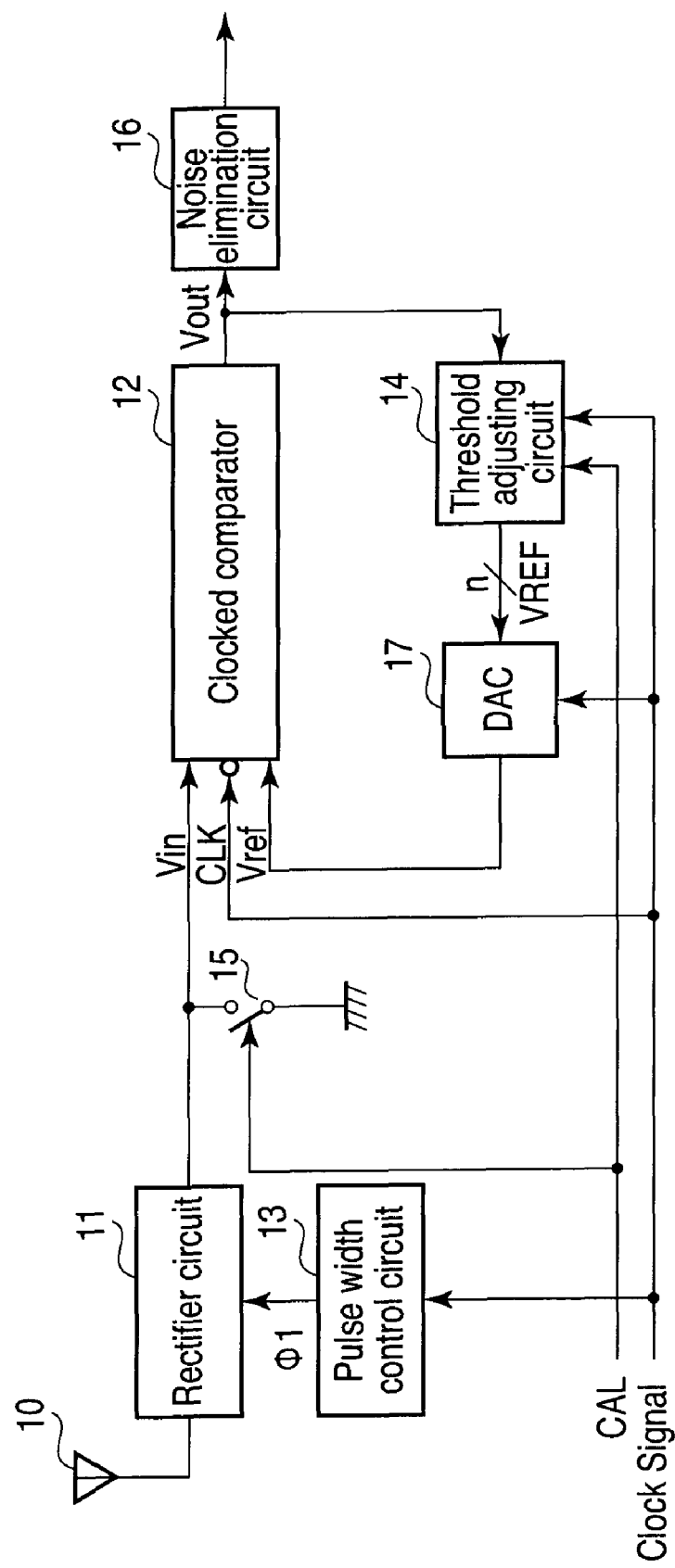
FIG. 11 is an exemplary block diagram showing an example of a configuration of an ASK demodulator circuit according to a second embodiment.

FIG. 11 is an exemplary block diagram showing an example of a configuration of an ASK demodulator circuit according to the second embodiment.

The ASK demodulator circuit shown in FIG. 11 comprises a rectifier circuit 11, a clocked comparator 12, a pulse width control circuit 13, a threshold adjusting circuit 14, a switch 15, and a noise elimination circuit 16, similarly to the ASK demodulator circuit shown in FIG. 1. The ASK demodulator circuit according to the present embodiment further comprises a digital-to-analog conversion circuit (DAC) 17. A threshold adjusting signal VREF which is a digital output from the threshold adjusting circuit 14 is supplied to the clocked comparator 12 via the DAC 17 as an analog adjusting voltage Vref.

Figure 12:
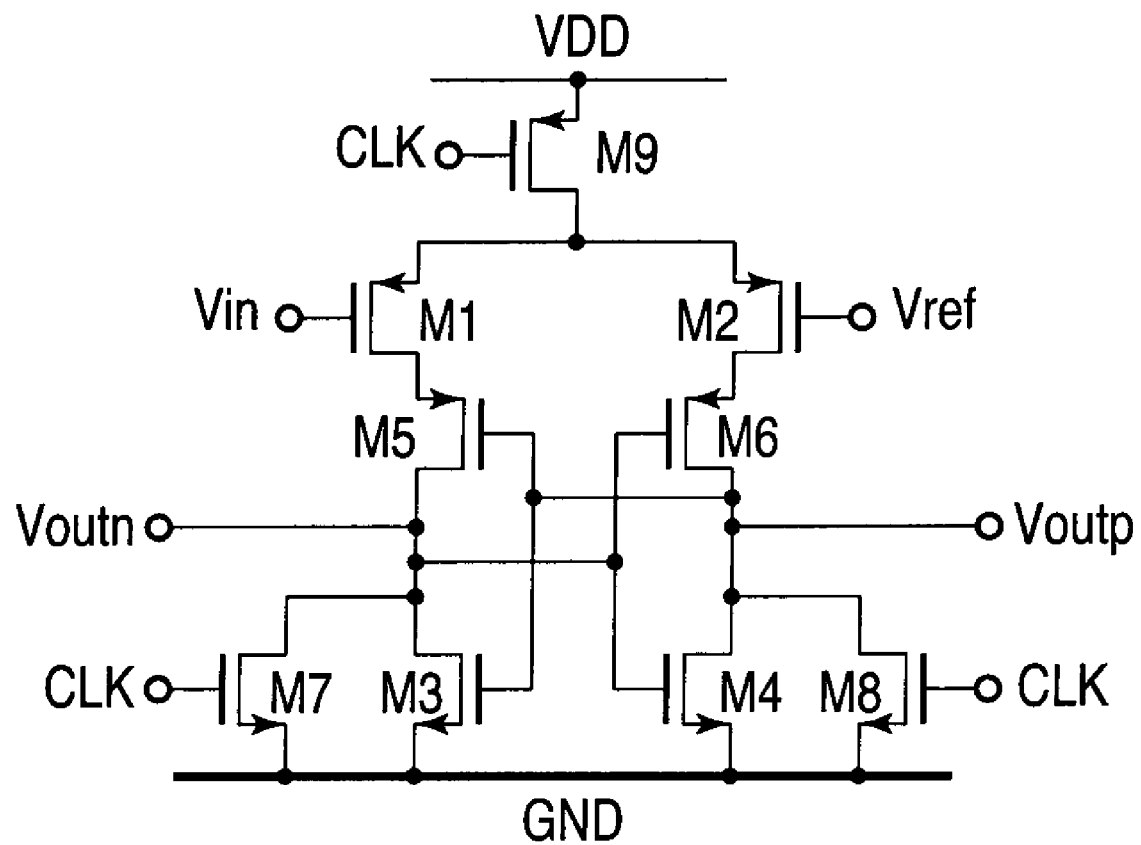
FIG. 12 is an exemplary view showing an example of a circuit configuration of a dynamic latch according to the second embodiment.

FIG. 12 is an exemplary view showing an example of a circuit configuration of a dynamic latch 20 according to the second embodiment. In the first embodiment, the threshold voltage is set depending on difference between load capacitances CREF and CVER. However, in the present embodiment, the analog adjusting voltage Vref from the DAC 17, which is based on the threshold adjustment performed by the threshold adjusting circuit 14, is connected to the gate of transistor M2 of the dynamic latch 20. The DC offset of the clocked comparator 12 is adjusted on the basis of the adjusting voltage Vref. Power consumption during standby for a wireless signal can be reduced by using a capacitance array type DAC as the DAC 17. However, another type of DAC may be used as the DAC 17.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The various modules of the systems described herein can be implemented as software applications, hardware and/or software modules, or components on one or more computers, such as servers. While the various modules are illustrated separately, they may share some or all of the same underlying logic or code.

What is claimed is:

1. An amplitude shift keying demodulator comprising:
    a rectifier circuit configured to supply a bias voltage at a predetermined timing and comprising a bias circuit configured to output a direct current voltage, a first MOS transistor in which the direct current voltage is applied between a gate terminal and a source terminal, a second MOS transistor in which the direct current voltage is applied between a gate terminal and a source terminal and a drain terminal is connected to the source terminal of the first MOS transistor, and a coupling capacitor having an end connected to the source terminal of the first MOS transistor and another end from which an alternate current signal is input; and
    a clocked comparator configured to compare an input signal rectified by the rectifier circuit with a threshold at a timing different from the predetermined timing and to output a binary signal.

2. The amplitude shift keying demodulator of claim 1, wherein the rectifier circuit operates in synchronization with a rising edge of a clock signal, and the comparator operates in synchronization with a falling edge of the clock signal.

3. The amplitude shift keying demodulator of claim 1, wherein the clocked comparator comprises a dynamic latch and a set-reset latch.

4. The amplitude shift keying demodulator of claim 3, wherein the dynamic latch comprises an input transistor section to which the input signal and a threshold are input, a positive feedback section which operates in accordance with the clock signal, and a load capacitance section comprising a fixed capacitance and a variable capacitance, and a threshold of the clocked comparator is controlled by changing the variable capacitance.

5. The amplitude shift keying modulator of claim 1, further comprising a threshold control module configured to detect a DC offset voltage of the clocked comparator and to set the DC offset voltage as the threshold of the clocked comparator.

6. The amplitude shift keying modulator of claim 5, further comprising an analog conversion module configured to perform analog conversion on an output from the threshold control module and to provide the clocked comparator with a result of the analog conversion.

7. The amplitude shift keying modulator of claim 1, wherein a predetermined bias voltage is applied to the rectifier circuit.

8. An amplitude shift keying modulating method comprising:
supplying a bias voltage to a rectifier circuit at a predetermined timing, the rectifier circuit comprising a bias circuit configured to output a direct current voltage, a first MOS transistor in which the direct current voltage is applied between a gate terminal and a source terminal, a second MOS transistor in which the direct current voltage is applied between a gate terminal and a source terminal and a drain terminal thereof is connected to the source terminal of the first MOS transistor, and a coupling capacitor having an end connected to the source terminal of the first MOS transistor and another end from which an alternate current signal is input; and
causing a clocked comparator to operate at a timing different from the predetermined timing, the clocked comparator comparing an input signal rectified by the rectifier circuit with a threshold.

* * * * *

UNITED STATES PATENT AND TRADEMARK OFFICE
CERTIFICATE OF CORRECTION

| | | |
|---|---|---|
| PATENT NO. | : 7,907,006 B2 | Page 1 of 1 |
| APPLICATION NO. | : 12/399451 | |
| DATED | : March 15, 2011 | |
| INVENTOR(S) | : Iwata et al. | |

It is certified that error appears in the above-identified patent and that said Letters Patent is hereby corrected as shown below:

Claim 8, column 12, line 12, change "terminal thereof" to --terminal--.

Signed and Sealed this
Seventh Day of June, 2011

David J. Kappos
*Director of the United States Patent and Trademark Office*